US009586455B2

(12) United States Patent
Sugai et al.

(10) Patent No.: US 9,586,455 B2
(45) Date of Patent: Mar. 7, 2017

(54) ROAD SURFACE CONDITION ESTIMATING APPARATUS

(75) Inventors: Haruhiko Sugai, Toyota (JP); Tomoyuki Nakamura, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 52 days.

(21) Appl. No.: 14/388,158

(22) PCT Filed: Mar. 29, 2012

(86) PCT No.: PCT/JP2012/002206
§ 371 (c)(1),
(2), (4) Date: Sep. 25, 2014

(87) PCT Pub. No.: WO2013/145015
PCT Pub. Date: Oct. 3, 2013

(65) Prior Publication Data
US 2015/0088378 A1 Mar. 26, 2015

(51) Int. Cl.
*B60G 17/0165* (2006.01)
*B60G 17/018* (2006.01)
*B60W 40/06* (2012.01)
*B60W 10/22* (2006.01)

(52) U.S. Cl.
CPC ....... *B60G 17/0165* (2013.01); *B60G 17/018* (2013.01); *B60G 17/0182* (2013.01); *B60W 10/22* (2013.01); *B60W 40/06* (2013.01); *B60G 2400/82* (2013.01); *B60G 2400/821* (2013.01); *B60G 2401/142* (2013.01);
(Continued)

(58) Field of Classification Search
CPC ............ B60G 17/0165; B60G 17/0182; B60G 17/018; B60W 10/22; B60W 40/06
See application file for complete search history.

(56) References Cited

U.S. PATENT DOCUMENTS

2009/0184845 A1* 7/2009 Saito .................. G06K 9/00805
340/937
2009/0262188 A1* 10/2009 Hoki .................... G06K 9/3233
348/140

(Continued)

FOREIGN PATENT DOCUMENTS

JP   A-5-262113    10/1993
JP   A-2002-29348   1/2002
(Continued)

*Primary Examiner* — John Q Nguyen
*Assistant Examiner* — Michael Whalen
(74) *Attorney, Agent, or Firm* — Oliff PLC (57) ABSTRACT

A camera takes an image or images of a region including a vehicle (vehicle-in-front) running in front of a driver's own vehicle. A wheel information acquiring unit acquires the positional information of a wheel or wheels of the vehicle-in-front in the image taken by the camera. More specifically, the boundary between the wheels of the vehicle-in-front and the road surface. The processing for detecting the boundary is done by use of the difference in the brightness between the wheels and the road surface of the vehicle-in-front. A camera attitude correcting unit corrects the detected boundary by use of a self-calibration function, and a road surface condition estimating unit estimates the conditions of the road surface on which the vehicle-in-front is traveling.

8 Claims, 4 Drawing Sheets

(52) U.S. Cl.
CPC ...... *B60G 2500/10* (2013.01); *B60G 2500/20* (2013.01); *B60W 2420/42* (2013.01)

(56) References Cited

U.S. PATENT DOCUMENTS

2013/0033600 A1* 2/2013 Higuchi ............. G06K 9/00805
348/148
2015/0291160 A1* 10/2015 Kim ..................... B60W 30/16
345/633

FOREIGN PATENT DOCUMENTS

| | | |
|---|---|---|
| JP | A-2005-178530 | 7/2005 |
| JP | A-2005-229444 | 8/2005 |

* cited by examiner

ROAD SURFACE CONDITION ESTIMATING APPARATUS

TECHNICAL FIELD

The present invention relates to a road surface condition estimating apparatus for estimating the surface conditions of a road.

BACKGROUND TECHNOLOGY

Patent Document 1 discloses a technology for estimating a road surface shape based on the behavior or actions of a forerunning vehicle (vehicle-in-front) running in front of a driver's own vehicle. More specifically, in Patent Document 1, the behavior of the vehicle-in-front is detected based on the behavior of mirrors or the license plate of the vehicle-in-front, and then the type or model of the vehicle-in-front is selected based on its amplitude and its convergence time. After the vehicle type has been selected, the road surface shape is estimated based on the selected vehicle type and the behavior of the vehicle-in-front. The thus estimated road surface shape is used to perform preview control of an active suspension apparatus, for instance.

RELATED ART DOCUMENTS

Patent Documents

[Patent Document 1] Japanese Patent Application Publication No. 2005-178530.

DISCLOSURE OF THE INVENTION

Problems to be Solved by the Invention

The technology disclosed in Patent Document 1, however, requires a complicated processing. Such a complicated processing includes identifying the vehicle type of a vehicle-in-front by utilizing the vehicle-type characteristics. Here, the vehicle-type characteristics gather or compile, for each vehicle type, a relationship between the maximum amplitude of vehicle body behavior and the convergence time. Where this technology is used, it is expected that when, for example, various factors about the suspension have been changed or replaced in the vehicle-in-front, this will make it difficult to accurately identify the vehicle type.

The present invention has been made in view of foregoing circumstances, and a purpose thereof is to provide a technology capable of simply and easily estimating the road surface conditions.

Means for Solving the Problems

In order to resolve the above-described problems, a road surface condition estimating apparatus according to one embodiment of the present invention includes: a wheel information acquiring means that acquires positional information about a wheel of a vehicle-in-front, the positional information thereabout being derived from an image picked up by an image pickup means that takes an image of a region including the vehicle-in-front; and an estimation means that estimates a condition of a road surface in a traveling direction by use of the extracted positional information about the wheel thereof.

According to this embodiment, the positional information about the wheel of the vehicle-in-front is utilized in estimating the road surface conditions. The movement of the wheel is not affected by the vehicle body behavior. Thus, estimating the road surface conditions by use of the positional information about the wheel of the vehicle-in-front can increase the estimation precision of the road surface conditions.

The wheel information acquiring means may acquire the positional information about the wheel thereof by detecting a boundary between the wheel of the vehicle-in-front and the road surface in the image picked up by the image pickup means. The road surface conditions can be directly detected by detecting the location of contact between the wheel and the road surface. This achieves a highly accurate estimation processing of the road surface conditions. The wheel information acquiring means may acquire the positional information about the wheels thereof by detecting a boundary between each of right and left wheels of the vehicle-in-front and the road surface. The road surface conditions can be directly detected by detecting the locations of contact between the right and left wheels and the road surface. This can be used to perform preview control of an active suspension apparatus, for instance.

The estimation means may estimate a height of the road surface based on the detected boundary between the wheel of the vehicle-in-front and the road surface. Also, the estimation means may measure a distance between the vehicle-in-front and a driver's own vehicle.

Effect of the Invention

The present invention provides a technology capable of simply and easily estimating the road surface conditions.

MODES FOR CARRYING OUT THE INVENTION

A vehicle according to the present embodiment includes a road surface condition estimating apparatus. And this road surface condition estimating apparatus estimates the conditions of a road surface in a traveling direction of the vehicle. More specifically, the road surface condition estimating apparatus detects the irregularities, the degree of inclination and the like of the road surface in a frontward area of the vehicle by use of information about the position of a wheel or wheels of a forerunning vehicle (vehicle-in-front) running in front of the driver's own vehicle. Here, the information about the position thereof is captured by an image pickup means that takes an image or images of the frontward area of the vehicle. The vehicle has an active suspension apparatus. And this active suspension apparatus regulates the vehicle height by controlling a stroke of the active suspension apparatus according to the road surface conditions estimated by the road surface condition estimating apparatus, thereby achieving the vehicle traveling with a stabilized attitude.

Figure 1:
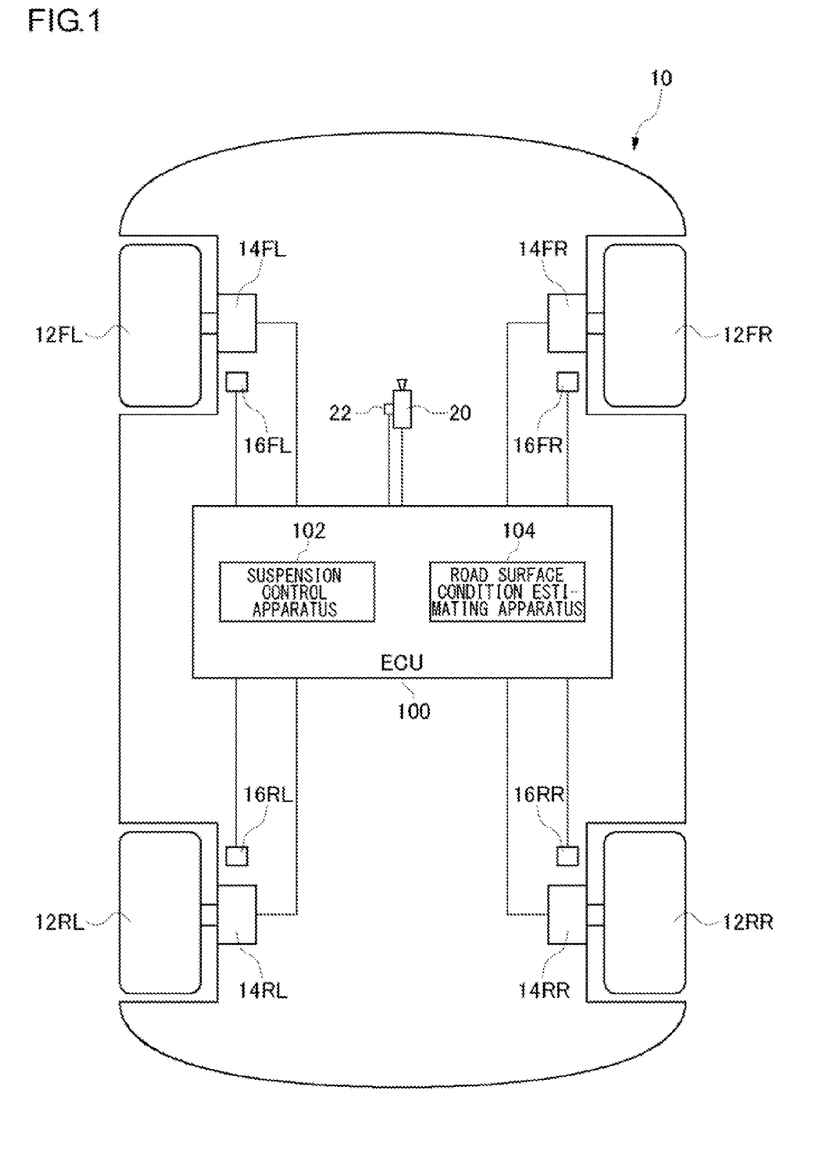
FIG. 1 is a top view schematically showing a vehicle in which a road surface condition estimating apparatus is installed.

FIG. 1 is a top view schematically showing a vehicle that mounts a road surface condition estimating apparatus. A vehicle 10 includes four wheels that are a right front wheel 12FR, a left front wheel 12FL, a right rear wheel 12RR and a left rear wheel 12RL. An electromagnetic suspension 14FR and a vehicle height sensor 16FR are provided on a right front wheel 12FR side. An electromagnetic suspension 14FL and a vehicle height sensor 16FL are provided on a left front wheel 12FL side. An electromagnetic suspension 14RR and a vehicle height sensor 16RR are provided on a right rear wheel 12RR side. An electromagnetic suspension 14RL and a vehicle height sensor 16RL are provided on a left rear wheel 12RL side. Hereinafter, the right front wheel 12FR, the left front wheel 12FL, the right rear wheel 12RR and the left rear wheel 12RL are generically referred to as "wheel 12" or "wheels 12" also, if no particular distinction is to be made between those wheels. Also, the electromagnetic suspension 14FR, the electromagnetic suspension 14FL, the electromagnetic suspension 14RR and the electromagnetic suspension 14RL are hereinafter generically referred to as "electromagnetic suspension 14" or "electromagnetic suspensions 14" also, if no particular distinction is to be made between those suspensions. Also, the vehicle height sensor 16FR, the vehicle height sensor 16FL, the vehicle height sensor 16RR and the vehicle height sensor 16RL are hereinafter generically referred to as "vehicle height sensor 16" or "vehicle height sensors 16" also, if no particular distinction is to be made between those sensors.

The electromagnetic suspension 14 is configured by a motor and an expansion apparatus, which is elongated and contracted by the motor. The electromagnetic suspension 14 together with coil springs (not shown) constitutes a vehicle suspension apparatus. This vehicle suspension apparatus operates as the active suspension apparatus. The coil springs prevent the impact of the wheels 12 from the road surface from being directly transmitted to a vehicle body. The electromagnetic suspension 14 generates a damping force, by controlling the motor, in between a "spring-above" part and a "spring-below" part of the vehicle 10. It is to be noted here that, in this patent specification, the position of components supported by the coil spring is called "spring-above" or "sprung", whereas the position not supported by the coil spring is called "spring-below" or "unsprung". In other words, "spring-above" or "sprung" indicates a vehicle body side, whereas "spring-above" or "unsprung" indicates a wheel 12 side.

The vehicle height sensor 16 that detects the height of the vehicle 10 in the position of the wheels 12 is installed near each wheel 12. The vehicle height sensor 16 detects a relative distance between the vehicle body and the wheel 12 by measuring a displacement of linkage that couples the vehicle body to an axle, for instance, or the vehicle height sensor 16 may be a sensor of other types as well. A detection signal of the vehicle height sensor 16 is sent to an electronic control unit 100 (hereinafter referred to as "ECU 100") that is provided in the vehicle body.

The ECU 100 includes a suspension control apparatus 102, which controls the electromagnetic suspension 14, and a road surface condition estimating apparatus 104, which estimates the road surface conditions. The suspension control apparatus 102 controls the electromagnetic suspension 14 of each wheel 12. The suspension control apparatus 102 can generate a desired damping force by regulating the amount of electric current applied to the motor of the electromagnetic suspension 14. In the present embodiment, as will be described later, the road surface condition estimating apparatus 104 estimates the conditions of a road surface in the traveling direction of the vehicle 10 by use of the image or images taken by a camera 20. The suspension control apparatus 102 may control the electromagnetic suspension 14 of each wheel 12 in accordance with the estimated road surface conditions and may stabilize the attitude of the vehicle 10.

Figure 2:
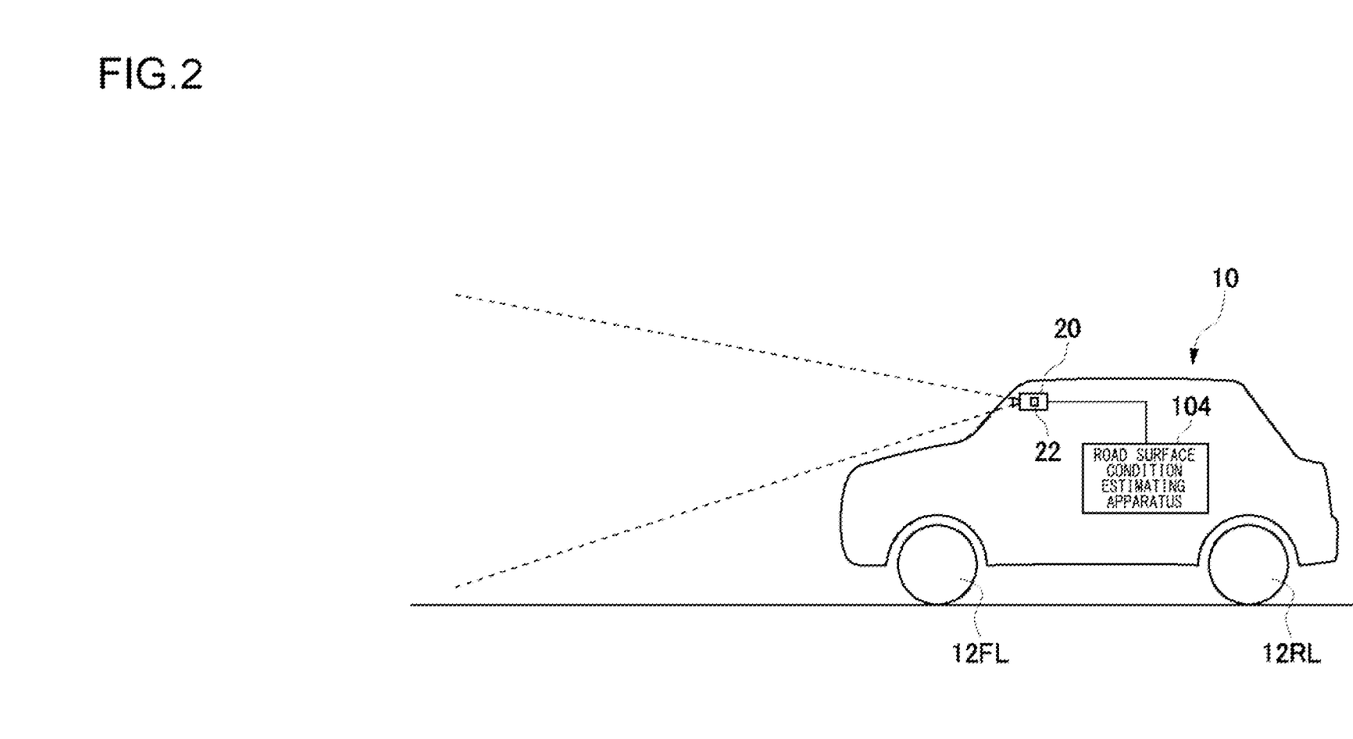
FIG. 2 is a side view schematically showing a vehicle in which a road surface condition estimating apparatus is installed.

FIG. 2 is a side view schematically showing a vehicle in which the road surface condition estimating apparatus is installed. The road surface condition estimating apparatus 104 receives the captured images from the camera 20 and also receives sensor values from a 3-axis acceleration sensor 22. The camera 20 is comprised of lenses and an image pickup unit, which includes image pickup devices such as CCDs (Charge-Coupled Device) and CMOSs (Complementary Metal-Oxide Semiconductors). Photo sensors are arranged, in a planar configuration, on light receiving surfaces of the image pickup devices. And a subject image, which is formed on the light receiving surfaces of the image pickup devices, are converted, by each photo sensor, into signal charges whose amount corresponds to the incident light quantity. The image pickup devices output the accumulated signal charges to an analog signal processing unit where image data of each color signal of R, G and B are generated, and then the thus generated image data thereof at the analog signal processing unit are outputted to an A/D (Analog-to-Digital) converter. The image data, which are now converted into digital signals by the A/D converter, are subjected to a digital processing, such as gamma correction, before the image data are fed to the road surface condition estimating apparatus 104. The camera 20, which is a video camera, carries out the above-described image pickup processing at predetermined cycles. The camera 20 may carry out the image pickup processing once in 1/30 seconds. The camera 20 is mounted to a rearview mirror, for instance, and takes images of a region in the traveling direction of the vehicle 10. In the example of FIG. 2, the camera 20 takes images of a frontward area of the vehicle 10.

The 3-axis acceleration sensor 22, which is mounted on or built into the camera 20, detects acceleration components in three axial directions of the camera 20. The 3-axis acceleration sensor 22 may be provided in a position far from the camera 20 inside the vehicle 10. However, since the camera 20 is provided in a "spring-above" location, it is preferable that the 3-axis acceleration sensor 22 be also provided in a "spring-above" location so as to detect the acceleration components in the three axial directions of the camera 20. The 3-axis acceleration sensor 22 supplies the detected sensor values to the road surface condition estimating apparatus 104 at predetermined cycles. It is preferable that the detection cycle by the 3-axis acceleration sensor 22 is shorter than or equal to the image pickup cycle of the camera 20. The road surface condition estimating apparatus 104 has a self-calibration function; upon receipt of the sensor values, the road surface condition estimating apparatus 104 calculates the attitude of the camera 20 and corrects it.

The road surface condition estimating apparatus 104 according to the present embodiment extracts a vehicle-in-front contained in the captured image and acquires positional information about the wheels of the vehicle-in-front (hereinafter referred to as "wheel position information" also). This wheel position information is information with which to identify the positions of the wheels in the height direction in the captured image. More specifically, the road surface condition estimating apparatus 104 extracts, as the wheel position information, the boundary lines between the right and left rear wheels of the vehicle-in-front and the road surface. In such a case, the road surface condition estimating apparatus 104 corrects the attitude of the camera by the self-calibration function, using the sensor values supplied from the 3-axis acceleration sensor 22. More specifically, the road surface condition estimating apparatus 104 identifies the attitude of the camera based on the sensor values and then corrects the positions (coordinates) of the boundary lines extracted from the captured image. The road surface condition estimating apparatus 104 determines a distance between each boundary line and the driver's own vehicle and thereby calculates the height of the road surface.

Various types of devices have already been known as measurement systems for measuring the distance from an object. For example, a stereo camera may be used as the camera 20, so that the distance from the object can be measured based on the images taken at two viewpoints. Even though a monocular camera is used as the camera 20, the distance from the object can be measured by using a motion stereo technique. If, as described in the present embodiment, the road surface condition estimating apparatus 104 can identify the attitude of the camera while the camera 20 is taking the images, the distance from the object can be determined from a single piece of captured image by neglecting a direction (i.e., lateral direction) vertical to a tilt direction. A laser ranging system for measuring the distance, between the vehicle-in-front and the driver's own vehicle, using a laser beam is also known in the art. Use of such a ranging system allows the road surface condition estimating apparatus 104 to measure the distance from the object. More specifically, the distances between the boundary lines, between the right and left rear wheels of the vehicle-in-front and the road surface, and the driver's own vehicle 10 can be measured. Note here that it can be regarded that the distance between the vehicle 10 and the boundary line is practically equal to the distance between the vehicle 10 and the vehicle-in-front. Thus, the road surface condition estimating apparatus 104 can obtain the distance between the vehicle 10 and the boundary line by measuring the distance between the vehicle 10 and the vehicle-in-front.

Figure 3:
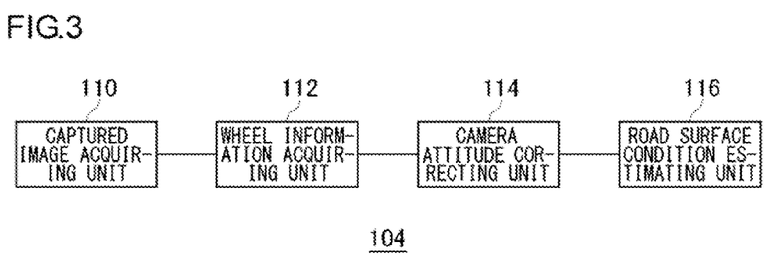
FIG. 3 is diagram showing functional blocks of a road surface condition estimating apparatus.

FIG. 3 is diagram showing the functional blocks of the road surface condition estimating apparatus 104. The road surface condition estimating apparatus 104 includes a captured image acquiring unit 110, a wheel information acquiring unit 112, a camera attitude correcting unit 114, and a road surface condition estimating unit 116. These structural components may be implemented hardwarewise by elements such as a CPU and memories of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

The captured image acquiring unit 110 acquires captured image data from the camera 20 that is an image pickup means. As discussed above, the camera 20, which is a video camera, takes images of a frontward area of the vehicle 10 and periodically supplies the captured image data to the captured image acquiring unit 110. The captured image acquiring unit 110 supplies the captured image data to the wheel information acquiring unit 112.

Figure 4:
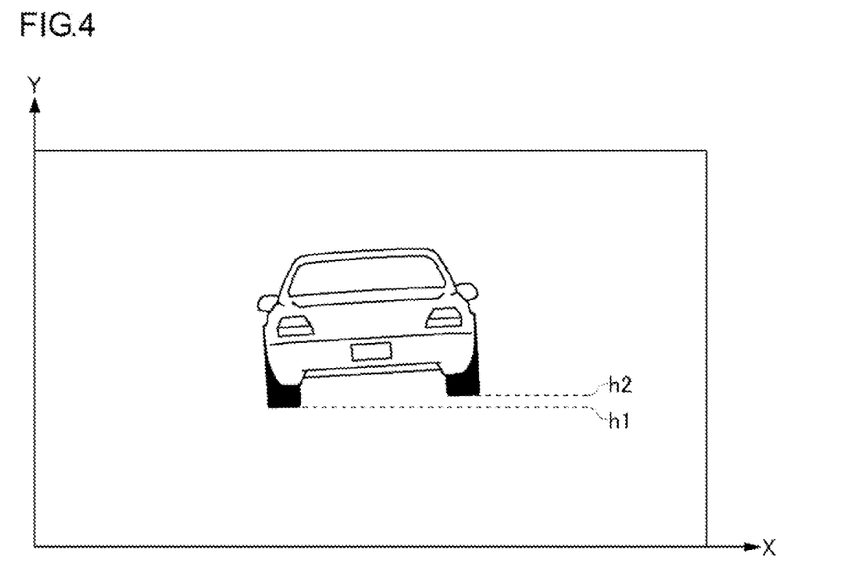
FIG. 4 shows an example of captured images.

FIG. 4 shows an example of the captured images. The wheel information acquiring unit 112 acquires the positional information on the wheels of the vehicle-in-front from the captured images where the images of a region including the vehicle-in-front in the traveling direction have been taken. The wheel information acquiring unit 112 first recognizes the presence of the vehicle-in-front in the captured image. Such a processing for recognizing the vehicle may be done using a known technique. For example, the vehicle-in-front is extracted from the captured image by subjecting the captured image to the pattern matching between the captured image and the pre-registered vehicle images. As the wheel information acquiring unit 112 has extracted the vehicle-in-front in the captured image, the positions of the wheels are identified. This processing for recognizing the vehicle is done in a manner such that the regions protruding downward in the right- and left-side portions of the extracted vehicle-in-front are searched. Upon identifying the positions of the wheels, the wheel information acquiring unit 112 extracts a boundary between the wheels and the road surface. The wheels are generally black in color, which differs from the color of the road surface. Upon identifying the wheels in the captured image, the wheel information acquiring unit 112 extracts a point or part below the wheels where a color (brightness) change occurs. The point or part, where the color change has occurred, indicates the boundary between the wheels and the road surface. Thus the wheel information acquiring unit 112 acquires the positions of the boundary between the wheels and the road surface, as the positional information on the wheels. For example, a center position of each wheel width may be acquired as a coordinate value representing the position of the boundary between each wheel and the road surface.

In the captured image of FIG. 4, the vehicle-in-front is tilted upward to the right (downward to the left) relative to the horizontal plane. Assume, in this captured image of FIG. 4, that the vertical axis is a Y axis and the horizontal axis is an X axis. Then the Y coordinates of the wheels are determined as follows: the Y coordinate of the left rear wheel of the vehicle-in-front is "h1" and the Y coordinate of the right real wheel thereof is "h2".

The camera attitude correcting unit 114 identifies the attitude of the camera 20. As described earlier, the 3-axis acceleration sensor 22 is mounted on the camera 20, and the camera attitude correcting unit 114 calculates the camera attitude, based on the sensor values fed from the 3-axis acceleration sensor 22. The vehicle height sensor 16 is installed near each wheel 12 of the vehicle 10 according to the present embodiment. For this reason, the camera attitude correcting unit 114 may calculate the attitude of the vehicle 10 by using a sensor value of the vehicle height sensor 16 provided at each wheel 12 and then may use the thus calculated attitude of the vehicle 10 as the camera attitude. If the 3-axis acceleration sensor 22 and the vehicle height sensors 16 are not installed in the vehicle 10, the camera attitude correcting unit 114 may identify the camera attitude by using a white line and a structure on the road surface, whose images have been picked up by the camera 20. For example, signboards on the road are usually placed in the upright position. Hence, the camera attitude may be identified by identifying the degree of inclination of such a signboard shot in the captured image.

After the camera attitude correcting unit 114 has identified the camera attitude, the camera attitude correcting unit 114 now detects an amount of displacement from a reference attitude and thereby corrects the boundary position between each of the wheels and the road surface. Note that the reference attitude is the camera attitude attained when the vehicle 10 travels on a flat road. The self-calibration function is a known art. If, however, the camera attitude is shifted from the reference attitude, carrying out the correction processing by the camera attitude correcting unit 114 will allow the boundary position between each of the wheels and the road surface in a captured image, otherwise captured on the flat road, to be determined.

The road surface condition estimating unit 116 derives the distance between the driver's own vehicle 10 and the boundary position, between each of the wheels of the vehicle-in-front and the road surface. The road surface condition estimating unit 116 measures the distance between the boundary position and the vehicle 10 by using the aforementioned ranging system. It is to be noted here that the road surface condition estimating unit 116 may measure the distance between the driver's own vehicle 10 and the vehicle-in-front and may use the thus measured distance as the distance between the driver's own vehicle 10 and the boundary position.

The road surface condition estimating unit 116 calculates the height of the road surface, based on the Y coordinate of the boundary position corrected by the self-calibration function. In the present embodiment, the three-axis components are corrected by the camera attitude correcting unit 114, so that the road surface condition estimating unit 116 can obtain, from a location of the driver's own vehicle 10, the absolute height of the road surface on which the vehicle-in-front travels. Here, the absolute height indicates heights including a difference between the height above the sea level of the driver's own vehicle 10 and the height above the sea level of the vehicle-in-front. Suppose, for example, that the difference in the height above the sea level between the driver's own vehicle 10 and the vehicle-in-front is 50 cm and that the right rear wheel of the vehicle-in-front is higher than the left rear wheel thereof by 20 cm. In this case, the calculations are made as follows. That is, the road surface that is in contact with the left rear wheel of the vehicle-in-front is higher than the driver's own vehicle 10 by 50 cm, and the road surface that is in contact with the right rear wheel of the vehicle-in-front is higher than the driver's own vehicle 10 by 70 cm. The road surface condition estimating unit 116 may obtain, as the height of the road surface, a relative height of the right and left rear wheels of the vehicle-in-front. In terms of the above example, the road surface condition estimating unit 116 may determine, without giving consideration to the difference in the height above the seal level, that the right rear wheel of the vehicle-in-front is higher than the left rear wheel thereof by 20 cm.

The road surface condition estimating unit 116 can gain the knowledge of the length in the real space corresponding to one pixel in the captured image, if the distance between the vehicle-in-front and the driver's own vehicle 10 is known. In the example of FIG. 4, the Y coordinate of the left rear wheel of the vehicle-in-front is h1 while the Y coordinate of the right rear wheel thereof is h2. Thus, in this case, the road surface condition estimating unit 116 can calculate the difference in height between the left rear wheel and the right rear wheel in the following manner. That is, the number of pixels contained in the length (h2−h1) in the Y-axis direction is detected and then the thus detected number of pixels is multiplied by the length in the real space corresponding to one pixel in the captured image. Instead, the road surface condition estimating unit 116 may prepare a table or a function with which to determine the actual height from both the distance between the vehicle-in-front and the driver's own vehicle 10 and the length (h2−h1) in the Y-axis direction and may obtain a relative height by using this table or function.

As described above, the road surface condition estimating unit 116 estimates the road surface conditions in the traveling direction by using the positional information about the wheels of the vehicle-in-front. Where the suspension control apparatus 102 uses the road surface information for the purpose of controlling the electromagnetic suspension 14, the suspension control is mainly performed in low to intermediate frequency domains. In such frequency domains, while using the fact that the input from the road surface is practically equal to the displacement of the wheels, the road surface condition estimating unit 116 according to the present embodiment regards that the displacement in the wheels and the displacement in the road surface are equivalent to each other. Then the road surface condition estimating unit 116 extracts the boundary line between each of the wheels of the vehicle-in-front and the road surface. In this manner, the road surface condition estimating unit 116 estimates the road surface conditions in the traveling direction. While the behavior of the wheels is affected by the road surface, the wheels are not affected, on the practical level, by the vehicle body behavior. In view of this fact, the road surface condition estimating unit 116 can estimate, with a high degree of accuracy, the road surface conditions in the traveling direction by eliminating the effect of the vehicle body behavior.

The road surface condition estimating unit 116 estimates the road surface conditions, based on the distances and the height of the road surface. If, for example, the calculation is so made that the distance between the vehicle-in-front and the driver's own vehicle 10 is 10 m and the height of the right rear wheel of the vehicle-in-front is greater than that of the left rear wheel thereof by 20 cm, the road surface condition 10 meters ahead can be estimated. This estimation processing may be so set that the estimation processing is performed in synchronism with the image pickup cycle of the camera 20; in other words, the estimation processing may be carried out for every ⅓₀ seconds. In the location 10 meters ahead, the road surface condition estimating unit 116 may not only estimate, as the road surface conditions, that the height of a road surface on which the right wheels pass is greater than that of a road surface on which the left wheels pass, but also estimate, as the road surface conditions, that the conditions of the road surface 10 meters ahead is tilted upward to the right.

Figure 5:
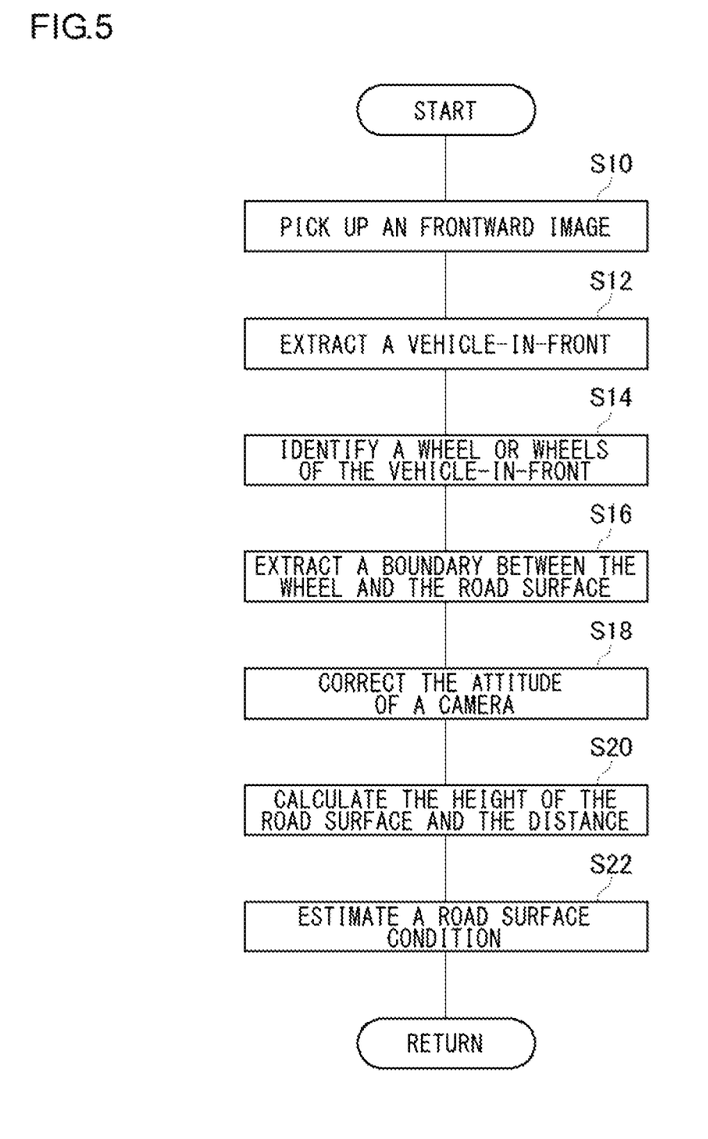
FIG. 5 is a flowchart showing a process for estimating the road surface conditions.

FIG. 5 is a flowchart showing a process for estimating the road surface conditions. The camera 20 takes an image or images of a vehicle-in-front running ahead of a driver's own vehicle and then supplies the captured image data to the road surface condition estimating apparatus 104 (S10). The wheel information acquiring unit 112 extracts the vehicle-in-front included in a captured image (S12) and identifies the wheel or wheels of the vehicle-in-front (S14). Subsequently, the wheel information acquiring unit 112 extracts a boundary between the wheel of the vehicle-in-front and the road surface (S16).

The camera attitude correcting unit 114 identifies the attitude of the camera while the camera is taking the images, and corrects the thus extracted boundary by use of the self-calibration function (S18). In the present embodiment, the wheel information acquiring unit 112 first extracts the boundary and then the camera attitude correcting unit 114 corrects the extracted boundary. Instead, the camera attitude correcting unit 114 may correct the captured image itself by use of self-calibration and then the wheel information acquiring unit 112 may derive, from the corrected captured image, the boundary between the wheel of the vehicle-in-front and the road surface. The road surface condition estimating unit 116 calculates the height of the road surface, on which the vehicle-in-front is traveling, and the distance between the vehicle-in-front and the driver's own vehicle based on the boundary between the wheels of the vehicle-in-front and the road surface (S20). Thereby, the road surface condition estimating unit 116 can estimate the road surface conditions in the frontward area of the driver's own vehicle 10 (S22). And, for example, the suspension control apparatus 102 is able to perform control of the vehicle height using the information concerning the thus estimated road surface conditions.

The present invention has been described by referring to the embodiments and such description is for illustrative purposes only. It is understood by those skilled in the art that any arbitrary combinations of the constituting elements and processes could be developed as modifications and that such modifications are also within the scope of the present invention.

If, for example, the resolution of the camera 20 is low, it may be assumed that the extraction of the boundary lines between the wheels of the vehicle-in-front and the road surface will be difficult. In such a case, the wheel information acquiring unit 112 may extract the coordinates (x, y) of the lowest parts of the right and left rear wheels and may then acquire a road surface difference, between right and left road surfaces, and/or a road surface cant (degree of road surface inclination). The coordinate values to be extracted may be the barycentric positions of the right and left rear wheels, respectively.

DESCRIPTION OF THE REFERENCE NUMERALS

10 Vehicle
12 Wheel(s)
14 Electromagnetic suspension
16 Vehicle height sensor
20 Camera
22 3-axis acceleration sensor
100 ECU
102 Suspension control apparatus
104 Road surface condition estimating apparatus
110 Captured image acquiring unit
112 Wheel information acquiring unit
114 Camera attitude correcting unit
116 Road surface condition estimating unit

INDUSTRIAL APPLICABILITY

The present invention can be used for estimating the road surface conditions.

What is claimed is:

1. A road surface condition estimating apparatus comprising:
a wheel information acquiring means that:
  (i) identifies a left wheel and a right wheel of a vehicle-in-front in an image picked up by an image pickup means that takes an image of a region including the vehicle-in-front, and
  (ii) acquires a coordinate value in a height direction of each of the identified left wheel and the identified right wheel, respectively, of the vehicle-in-front;
an estimation means that estimates a tilt of a road surface under the left and right wheels of the vehicle-in-front based on a difference between the coordinate value in the height direction of the right wheel of the vehicle-in-front and the coordinate value in the height direction of the left wheel of the vehicle-in-front, wherein the height direction is a direction normal to a horizontal plane; and a suspension control apparatus that controls an electromagnetic suspension of at least one wheel of a vehicle configured to hold the road surface condition estimating apparatus in accordance with the estimated condition of the road surface to stabilize the attitude of the vehicle configured to hold the road surface condition estimating apparatus.

2. The road surface condition estimating apparatus according to claim 1, wherein the wheel information acquiring means acquires the coordinate values of the right and left wheels, respectively, of the vehicle-in-front by detecting a boundary between each of the right and left wheels, respectively, and the road surface in the image picked up by the image pickup means.

3. The road surface condition estimating apparatus according to claim 2, wherein the estimation means estimates a height of the road surface based on at least one of the respective detected boundaries between the right wheel and the left wheel, respectively, of the vehicle-in-front and the road surface.

4. The road surface condition estimating apparatus according to claim 1, wherein the estimation means measures a distance between the vehicle-in-front and the vehicle configured to hold the road surface condition estimating apparatus.

5. The road surface condition estimating apparatus according to claim 1, wherein the estimated condition of the road surface includes a height of the road surface in a frontward area of the vehicle configured to hold the road surface condition estimating apparatus.

6. The road surface condition estimating apparatus according to claim 1, wherein the estimated condition of the road surface indicates a direction in which the road surface is tilted.

7. A road surface condition estimating apparatus comprising:
a processor programmed to:
  acquire an image captured by a camera;
  identify, based on the acquired captured image, a left wheel and a right wheel of the vehicle-in-front;
  determine a coordinate value in a height direction of each of the identified left wheel of the vehicle-in-front and the identified right wheel of the vehicle-in-front;
  estimate a tilt of a road surface under the left and right wheels of the vehicle-in-front based on a difference between the coordinate value in the height direction of the right wheel of the vehicle-in-front and the coordinate value in the height direction of the left wheel of the vehicle-in-front, wherein the height direction is a direction normal to a horizontal plane; and
  control an electromagnetic suspension of at least one wheel of a vehicle configured to hold the road surface condition estimating apparatus in accordance with the estimated condition of the road surface to stabilize the attitude of the vehicle configured to hold the road surface condition estimating apparatus.

8. A road surface condition estimating apparatus comprising:
a processor programmed to:
  acquire an image captured by a camera configured to capture an image of a region that includes a vehicle-in-front;
  identify, based on the acquired captured image, a left wheel and a right wheel of the vehicle-in-front;

determine a coordinate value in a height direction of each of the identified left wheel of the vehicle-in-front and the identified right wheel of the vehicle-in-front; and estimate a tilt of a road surface under the left and right wheels of the vehicle-in-front based on a difference between the coordinate value in the height direction of the right wheel of the vehicle-in-front and the coordinate value in the height direction of the left wheel of the vehicle-in-front, wherein the height direction is a direction normal to a horizontal plane; and control an electromagnetic suspension of at least one wheel of a vehicle configured to hold the road surface condition estimating apparatus in accordance with the estimated condition of the road surface to stabilize the attitude of the vehicle configured to hold the road surface condition estimating apparatus.

\* \* \* \* \*